Oct. 7, 1941.  W. C. STARKEY  2,257,987

CLUTCH CONSTRUCTION

Filed Oct. 2, 1939

INVENTOR.
WILLIAM CARLETON STARKEY.
BY Lockwood, Goldsmith + Galt.
ATTORNEYS.

Patented Oct. 7, 1941

2,257,987

UNITED STATES PATENT OFFICE 2,257,987

CLUTCH CONSTRUCTION

William Carleton Starkey, Indianapolis, Ind., assignor to L. G. S. Spring Clutches, Incorporated, Indianapolis, Ind., a corporation Application October 2, 1939, Serial No. 297,533

5 Claims. (Cl. 192—74)

This invention relates to a clutch construction particularly adapted for heavy duty with an extremely variable or reversible load where backlash is undesirable. Certain features of the invention however are equally applicable to other types of service.

In my co-pending application Serial No. 278,401, filed June 10, 1939, now Patent No. 2,219,877 issued October 29, 1940, I have disclosed a clutch construction for similar duty in which two helical clutch springs are employed each of which is adapted to transmit power in one direction only and to serve as an overrunning clutch in the opposite direction.

One object of the present invention is to simplify a construction for similar duty and particularly to provide one in which a single helical clutch spring serves to transmit torque in both directions.

A further object of the invention is to provide simple and positive means for actuating a clutch of the helical coil spring type. This is accomplished in the present invention by providing a frusto-conical clutch surface on the spring and actuating the same by means of an actuator having a mating surface which may be frictionally engaged by said frusto-conical spring surface.

Figure 1:
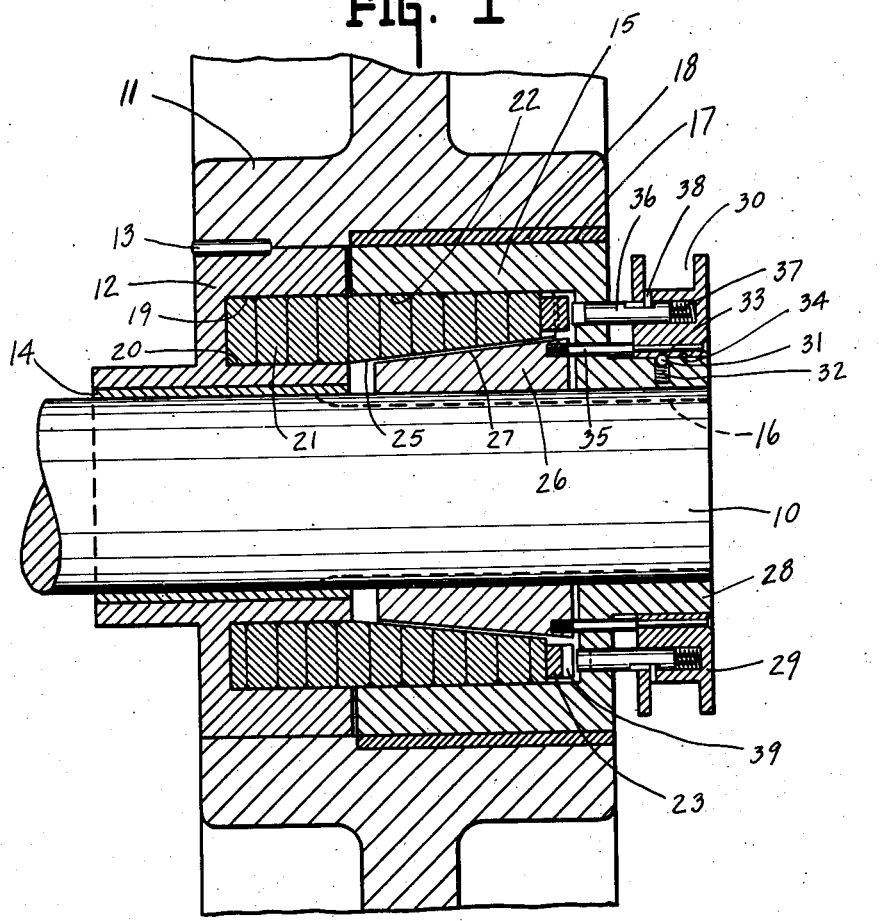
Figure 2:
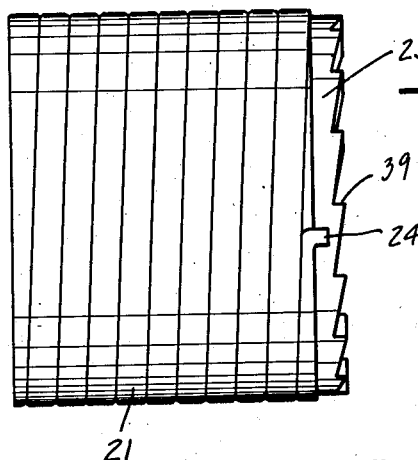

Other objects and features of the invention will be understood from the accompanying drawing and the following description and claims:

Fig. 1 is a central sectional view of a clutch construction in accordance with a preferred form of the invention. Fig. 2 is an elevational view of the clutch spring and an associated actuator part.

One of the principal uses of a construction of this type is in transmitting power from the flywheel to the crank shaft of a heavy duty punch press. In such presses the flywheel is usually either belt or gear driven and runs freely on the crank shaft except when the clutch is operated to connect the same operatively with the crank shaft. The load is extremely variable and any backlash in the clutch construction results in undesirable shocks producing heavy wear on all parts of the machine.

In the drawing there is illustrated a portion of a shaft 10 which may be considered as the crank shaft of a punch press. A hub 11 of the flywheel is provided with a pocket member 12 which is pressed into the hub and secured as by dowel 13 and which carries an anti-friction bushing 14 running freely on the shaft 10. A pocket member 15 is keyed to the shaft 10 by means of a key 16 and is provided with a cylindrical outer surface 17 serving as a journal for an anti-friction bushing 18 which is pressed into the hub 11. The member 12 is provided with a spring pocket having a cylindrical internal surface 19 and a cylindrical external surface 20 both of which are coaxial with the shaft 10. A helically wound clutch spring 21 is retained in said pocket and is of proper size to be pressed into position therein.

The member 15 is provided with a spring pocket having a cylindrical internal surface 22 coaxial with the shaft 10 and of slightly larger diameter than the surface 19. Several turns of the spring 21 extend into this pocket and their outer diameter is such that when unstressed the pocket member 15 may run freely thereon. A ratchet ring 23, best seen in Fig. 2, is secured to the free end of the spring 21 and is restrained against rotation with relation to said spring by means of a lug 24 formed on the spring and entering a suitable recess in the ring 23.

The free turns of the spring 21 within the pocket member 15 are provided with a frusto-conical internal clutch surface 25 coaxial with the shaft 10. An actuator member 26 having a mating frusto-conical surface 27 is splined to the shaft 10 and is engaged with and disengaged from the surface 25 by axial movement on said shaft. The pocket member 15 is formed with a hub 28 on which there is slidably mounted a clutch collar 29. Said collar is provided with an external groove 30 adapted to cooperate with any well known form of clutch finger or shifting fork for moving the collar to right or left in Fig. 1. A ball 31 carried in a recess in the hub 28 and outwardly pressed by a spring 32 engages a pair of recesses 33 and 34 in the inner surface of the collar 29 to hold the same in either a left-hand or a right-hand position. A plurality of pins 35 are mounted on the collar 29 and are secured to the actuator member 26. Said pins extend through suitable openings in the pocket member 15 and serve to move the actuator member 26 into and out of engagement with the spring 21 as the collar 29 is moved to the left or right.

A plurality of actuator pins 36 are slidably mounted in openings in the collar 29 and are outwardly pressed by compression springs 37 contained in said recesses. The reciprocal movement of said pins is limited by stop pins 38 carried by the collar 29 and engaging suitable recesses in said pins. The pins 36 extend through openings in the pocket member 15 and are adapted to engage teeth 39 formed on the ratchet ring 23.

In the operation of the apparatus, during an idle period of the machinery, the collar 29 is in its extreme right-hand position as shown in Fig. 1 with the actuator member 26 out of engagement with the clutch spring 21 and the actuator pins 36 out of engagement with the teeth of the member 23. The flywheel runs freely on the shaft 10 and the spring 21 is of course rotating with the flywheel. The pocket member 15, the collar 29 and associated parts are stationary. When it is desired to connect the flywheel and shaft for transmission of power to the shaft, the collar 29 is shifted to the left. The pins 36 engage the teeth 39 and exert on the rotating spring a force tending to expand the same against the clutch surfaces 22 and 19. It is assumed that the direction of rotation of the flywheel is such that the frictional engagement of said surfaces tend still further to uncoil the spring which is thus clutched more tightly to said surfaces and serves to transmit power from the flywheel to the shaft. At the same time, the member 26 is pressed into engagement with the frusto-conical interior surface 25 and is held in engagement therewith by the spring pressed ball 31. Since the spring is slightly expanded, the member 26 assumes a position such that any release of the expanding force on the spring tends to cause the same to grip the surface of the member 26. This may occur if the load is momentarily released or if the momentum of the irregularly moving parts connected to the shaft 10 is such as to cause the shaft to attempt to overrun the flywheel. When this occurs an extremely small relative movement of the parts is sufficient to cause the spring 21 to frictionally grip the member 26 with enough force to prevent any appreciable backlash in the apparatus.

The construction just described is particularly suitable for prevention of back lash in a machine such as a punch press where the load is suddenly released as the punch completes its operation and the momentum of moving parts tends to cause the driven member to overtravel the driving member. However, it is equally useful in installations where the direction of rotation is reversible. In such installations the outer clutch surface of the spring 21 carries the load in one direction and the inner clutch surface thereof carries the load in the opposite direction with substantially no back lash at the time of reversal. In either type of installation the use of the sliding actuator 26 prevents back lash but permits liberal clearness between the surfaces of the spring and the mating clutch surfaces when the machine is running idle. The frusto-conical actuator may also be employed alone for the transmission of power in one direction only. Other variations in the details of the invention may be made without departing from the scope thereof as defined by the appended claims.

The invention claimed is:

1. In a clutch construction, a pair of coaxially rotatable members one of which is a driving member and the other a driven member, and one of which is provided with an internal cylindrical clutch surface coaxial with the axis of rotation, a helical clutch spring having one end anchored to the other of said members and the other end free, the free end of said spring when expanded being adapted to clutch said cylindrical clutch surface and said free end having a frusto-conical interior surface, an actuator adapted to exert an expanding force on the free end of said spring for clutching the same to said clutch surface, and a frusto-conical member constrained to rotate with the rotatable member having said clutch surface and movable with respect thereto to engage the frusto-conical inner surface of said spring to prevent backlash in the operation of said clutch construction.

2. In a clutch construction, a pair of coaxially rotatable members one of which is a driving member and the other a driven member, and one of which is provided with an internal cylindrical clutch surface coaxial with the axis of rotation, a helical clutch spring having one end anchored to the other of said members and the other end free, the free end of said spring when expanded being adapted to clutch said cylindrical clutch surface and said free end having a frusto-conical interior surface, an actuator adapted to exert an expanding force on the free end of said spring for clutching the same to said clutch surface, a frusto-conical member constrained to rotate with the rotatable member having said clutch surface and movable with respect thereto to engage the frusto-conical inner surface of said spring to prevent backlash in the operation of said clutch construction, and means for moving said actuator and said frusto-conical member together 3. An anti-backlash clutch construction for transmission of power between a shaft and a flywheel or the like coaxially rotatable therewith, said construction including, a spring pocket secured to said shaft, a helical clutch spring having one end anchored to said flywheel and the other end free and extending into said pocket, the free end having a frusto-conical interior surface, an actuator constrained to rotate with said shaft and movable axially thereof to engage the free end of said spring and exert thereon an expansive force tending to engage said spring with an inner face of said pocket, a second actuator splined to said shaft and having a frusto-conical surface engageable with the frusto-conical surface of said shaft, and a common means for moving both actuators simultaneously.

4. In a clutch construction adapted for reversible drive, a rotatable driving element, a driven element coaxially rotatable therewith, a helical clutch spring having one end anchored to one of said elements and the other end normally free, the free end of said spring having an external clutch surface engageable with a mating clutch surface on the other of said elements for transmission of torque therebetween in one direction when said spring is expanded, an actuator constrained to rotate with said other element but movable axially thereof, said actuator having a frusto-conical clutch surface engageable with a mating interior clutch surface on the free end of said spring for transmission of torque therebetween in the opposite direction when said actuator is axially moved, and an actuator adapted to exert an expanding force on said spring.

5. In a clutch construction, a rotatable driving element, a driven element coaxially rotatable therewith, a helical clutch spring having one end anchored to one of said elements and the other end normally free, the free end of said spring having a clutch surface engageable with a mating clutch surface on the other of said elements when said spring is stressed, said free end also having a frusto-conical clutch surface, one of said clutch surfaces on said spring being internal and the other external, an actuator constrained to rotate with said other element but movable axially thereof, said actuator having a clutch surface engageable with said frusto-conical clutch surface when said actuator is axially moved, and an actuator adapted to exert a force on said spring tending to stress the same to engage said first mentioned clutch surface with the mating surface.

WILLIAM CARLETON STARKEY.